(12) United States Patent
Bieber

(10) Patent No.: US 10,646,075 B2
(45) Date of Patent: May 12, 2020

(54) ALUMINUM FOIL PAN CARRIER SYSTEM

(71) Applicant: 2492454 Ontario Limited, Essex, Ontario (CA)

(72) Inventor: Alice M. Bieber, Cottam (CA)

(73) Assignee: 2492454 ONTARIO LIMITED, Essex, Ontario (CA)

( * ) Notice: Subject to any disclaimer, the term of this patent is extended or adjusted under 35 U.S.C. 154(b) by 0 days.

(21) Appl. No.: 15/794,267

(22) Filed: Oct. 26, 2017

(65) Prior Publication Data

US 2018/0110376 A1    Apr. 26, 2018

Related U.S. Application Data

(60) Provisional application No. 62/413,002, filed on Oct. 26, 2016.

(51) Int. Cl.
*A47J 45/10* (2006.01)

(52) U.S. Cl.
CPC .................... *A47J 45/10* (2013.01)

(58) Field of Classification Search
CPC .......... A47J 45/10; A47J 36/34; A47J 37/108; A47J 47/16; A47J 2202/00; A47J 36/32; A47J 37/043; A47J 37/0786; A47J 37/1271; A47J 39/003; A47J 39/006; A47J 43/00; A47J 43/18; A47J 43/288; A47J 44/00; A47J 44/02
USPC .... 248/149, 152, 176.2, 316.1, 346.1, 346.7
See application file for complete search history.

(56) References Cited

U.S. PATENT DOCUMENTS

| | | | |
|---|---|---|---|
| 640,453 A | 1/1900 | Devers | |
| 695,502 A | 3/1902 | Smith | |
| 899,992 A | 9/1908 | Kessler | |
| 1,683,190 A | 9/1928 | Hughey et al. | |
| 1,684,925 A * | 9/1928 | Perlmutter | F21V 21/06 248/346.07 |
| 2,049,129 A | 7/1936 | McNeil | |
| 2,947,458 A * | 8/1960 | Troendly | A47J 45/10 294/32 |
| 2,992,848 A | 7/1961 | Livensparger | |
| 3,279,730 A * | 10/1966 | Holmes | A47G 33/12 248/346.03 |
| 3,431,836 A | 3/1969 | Murrell | |
| 3,507,321 A | 4/1970 | Palma | |
| 3,599,558 A | 8/1971 | Goldberg | |
| 3,967,803 A * | 7/1976 | Kienlen | A47J 36/34 248/152 |
| 3,972,318 A | 8/1976 | Jacques | |
| 4,350,099 A * | 9/1982 | Persson | B65D 19/0075 108/56.1 |
| 4,677,906 A * | 7/1987 | Lowe | A47J 36/20 206/804 |
| 4,717,038 A | 1/1988 | Anders | |

(Continued)

FOREIGN PATENT DOCUMENTS

CA    1317774    5/1993

*Primary Examiner* — Muhammad Ijaz
(74) *Attorney, Agent, or Firm* — William A. Ziehler; Shumaker, Loop & Kendrick, LLP

(57) ABSTRACT

An aluminum foil pan carrier system includes a first rigid support arm and a second rigid support arm. The first rigid support arm and the second rigid support arm are configured to support an aluminum foil pan. The aluminum foil pan can have a rectangular shape, a circular shape, or an ovular shape.

18 Claims, 16 Drawing Sheets

(56) References Cited

U.S. PATENT DOCUMENTS

| | | | |
|---|---|---|---|
| 4,741,262 A | 5/1988 | Moncrief | |
| 4,817,812 A | 4/1989 | Sarnoff | |
| 4,852,760 A | 8/1989 | Sarnoff | |
| 5,029,721 A | 7/1991 | Timpe | |
| 5,181,686 A * | 1/1993 | Barthel | F26B 25/18 |
| | | | 248/173 |
| 5,203,254 A | 4/1993 | Fletcher | |
| 5,339,728 A | 8/1994 | Marchwiak | |
| 5,404,800 A * | 4/1995 | Hsu | A47J 36/34 |
| | | | 126/373.1 |
| 5,503,062 A * | 4/1996 | Buff, IV | A47J 36/22 |
| | | | 99/426 |
| 5,921,169 A * | 7/1999 | Sekerich | A21B 7/005 |
| | | | 99/348 |
| 5,950,838 A | 9/1999 | Fletcher | |
| D416,169 S * | 11/1999 | Sarnoff | D7/388 |
| 6,065,629 A * | 5/2000 | Sarnoff | B65D 1/34 |
| | | | 220/315 |
| 6,116,154 A | 9/2000 | Vaseloff | |
| 6,131,506 A | 10/2000 | Kemper | |
| 6,237,803 B1 | 5/2001 | Sarnoff | |
| D544,748 S * | 6/2007 | Johansson | D7/387 |
| D594,272 S * | 6/2009 | Heroux | D7/387 |
| D660,644 S * | 5/2012 | Beijl | D7/213 |
| 8,701,651 B2 * | 4/2014 | King | A47J 36/34 |
| | | | 126/152 R |
| 9,661,767 B2 * | 5/2017 | Danicich | B60R 11/00 |
| 10,060,572 B1 * | 8/2018 | Don | F16M 11/041 |
| 2005/0205728 A1 * | 9/2005 | Avery | A45F 5/00 |
| | | | 248/149 |
| 2009/0294617 A1 * | 12/2009 | Stacey | B60R 11/02 |
| | | | 248/316.1 |
| 2011/0073723 A1 * | 3/2011 | Ashpole | A47C 4/20 |
| | | | 248/176.2 |
| 2013/0206942 A1 * | 8/2013 | Trotsky | F16M 11/041 |
| | | | 248/274.1 |
| 2014/0332651 A1 * | 11/2014 | Bazley | A47J 47/16 |
| | | | 248/346.01 |
| 2015/0250357 A1 * | 9/2015 | Zhitnitsky | A47J 36/34 |
| | | | 248/423 |
| 2018/0110376 A1 * | 4/2018 | Bieber | A47J 45/10 |

* cited by examiner

ALUMINUM FOIL PAN CARRIER SYSTEM

CROSS-REFERENCE TO RELATED APPLICATIONS

This application claims the benefit of U.S. Provisional Application No. 62/413,002, filed on Oct. 26, 2016. The entire disclosure of the above application is incorporated herein by reference.

FIELD

The present technology relates to a carrier system that is used to lift and transport aluminum foil pans both into and out of an oven or other cooking, heating, freezing, serving, display, or processing system.

INTRODUCTION

This section provides background information related to the present disclosure which is not necessarily prior art.

Aluminum foil pans are widely used in home, restaurant, and industrial cooking because of their inexpensive nature and the ability of aluminum to conduct heat readily and evenly. Typically, the aluminum foil pan is constructed from very thin formed aluminum sheet that has ribs and dimples formed into its shape as reinforcements along with a multilayer rolled over rim. The rim provides strength to the aluminum foil pan and also provides a convenient lifting and carrying method whereby the user grips the rim and lifts and carries the aluminum foil pan. While these structural enhancements do provide improved strength, they are insufficient to prevent collapse, during lifting or transport, of the aluminum foil pan when it is partially or fully loaded with typical food stuffs such as a turkey, a roast, cabbage rolls, etc.

One solution to this problem of aluminum foil pan collapse during lifting and carrying is to place the loaded aluminum foil pan on a cookie sheet during its use. While this is a generally acceptable method for lifting and carrying aluminum foil pans when they are loaded, the center of gravity of the full aluminum foil pan is located above the lift points on the cookie sheet leading to instability and potential tipping during lifting and carrying.

It is therefore important that the lift and carry points of the aluminum foil pan carrier system be located near the rolled rim area of the aluminum foil pan so that the center of gravity of the loaded aluminum foil pan is below the lift and carry points, providing for a stable lift and carry operation.

Various devices that have been proposed to remove hot cooking vessels from ovens. Many of these devices are designed to function only with rigid pans and plates as they clamp to the edges of the pan or plate to be removed from the oven. Other devices are used inside the pan to provide an easy means to remove the hot food item from the cooking vessel. A few of these devices are designed to be used with aluminum foil pans and all of these are of a wire construction, providing only limited carrying capacity.

Examples of various devices used to remove hot cooking vessels include:

U.S. Pat. No. 660,453, "Plate or Pan Holder or Lifter", Devers, J, C, 2 Jan. 1900, discloses a lifting device for removing rigid pans or plates from an oven.

U.S. Pat. No. 695,502, "Automatic Pan Lifter", Smith, T, T, 18 Mar. 1902, discloses a lifter to remove rigid pans from an oven.

U.S. Pat. No. 899,992, "Pan Holder and Stove Lid Lifter", Kessler, B, 29 Sep. 1908, discloses a lifting device to remove rigid pans from an oven.

U.S. Pat. No. 1,683,190, "Pan Lifter", Hughey et al, 4 Sep. 1928, discloses a lifting device to remove rigid pans from an oven.

U.S. Pat. No. 2,049,129, "Pie Pan Holder", McConnel, E, F, 28 Jul. 1936, discloses a lifter to remove rigid pie pans from an oven.

U.S. Pat. No. 2,992,848, "Receptacle Lifter", Livensparger, E, W, 18 Jul. 1961, discloses a device to lift pans or plates from an oven.

U.S. Pat. No. 3,431,836, "Pie Pan Holder", Murrell, R, E, March, 1969, discloses a device to support rigid pie plates during cooking in an oven.

U.S. Pat. No. 3,507,321, "Fabric Dish and Pan Holder", Peterson, Joy, T, 21 Apr. 1970, discloses a fabric holder for dishes or pans that is used to provide easy transport.

U.S. Pat. No. 3,599,558, "Cooking Accessory", Goldberg, Allan, R, 17 Aug. 1971, discloses a supporting rack system for a multi pocket disposable cooking tray.

U.S. Pat. No. 3,972,318, "Utensil for Oven Cooking", Jacques, A, J, 3 Aug. 1976, discloses an oven pan with an internal rack.

U.S. Pat. No. 4,717,038, "Disposable Pan", Anders, Gary, P, 5 Jan. 1988, discloses an aluminum foil pan with wire handles built in.

U.S. Pat. No. 4,741,262, "Collapsible Rack for Meat", Moncrief, Nellie, L, et al, 3 May 1988, discloses a collapsible rack to be placed under meat in a roasting pan.

U.S. Pat. No. 4,817,812, "Holding Frame for an Oven Pan", Sarnoff et al, 4 Apr. 1989, discloses a wire frame to support an aluminum foil oven pan.

U.S. Pat. No. 4,852,760, "Oven Pan Holder and Combination of Oven Pan Holder with Oven Pan", Sarnoff et al, 1 Aug. 1989, discloses a wire frame support an aluminum foil oven pan and a method to connect the frame to the aluminum foil pan.

U.S. Pat. No. 5,029,721, "Disposable Cooking Utensil", Timpe, William, W, 9 Jul. 1991, discloses an aluminum foil pan with an attached wire support frame and handles.

U.S. Pat. No. 5,203,254, "Combination Cooking Rack and Pan Assembly", Fletcher, Carl, R, 40, April, 1993, discloses a wire frame to support an aluminum foil oven pan and a method to connect the frame to the aluminum foil pan.

U.S. Pat. No. 5,339,728, "Cooking Rack for a Pan", Marchwiak et al, 13 Aug. 1994 discloses a wire frame to support an aluminum foil oven pan and a method to connect the frame to the aluminum foil pan.

U.S. Pat. No. 5,503,062, "Wire Support and Inner Rack for Thin Aluminum Roasting Pan", Buff, George, J, 4 Apr. 1996, discloses an inner and outer wire frame to support an aluminum foil pan.

U.S. Pat. No. 5,950,838, "Foil Pan Packaging", Fletcher, Carl, R, 14 Sep. 1999, discloses a packaging method for foil pans.

U.S. Pat. No. 6,065,629, "Roasting Rack and Pan/Cover Assembly", Sarnoff et al, 23 May 2000, discloses a wire frame to support an aluminum foil oven pan and a method to connect the frame to the aluminum foil pan as well as attaching an aluminum cover.

U.S. Pat. No. 6,116,154, "Food Pan Management System in Food Warming Apparatus", Vaseloff, D, J, 12 Sep. 2000, discloses a means of moving food pans.

U.S. Pat. No. 6,131,506, "Roasting Pan", Kemper, T, D, 17 Oct. 2000, discloses a roasting pan and wire support structure.

U.S. Pat. No. 6,237,803, "Roasting and Pan/Cover Assembly", Sarnoff et al, 29 May 2001, discloses a wire frame to support an aluminum foil oven pan and a method to connect the frame to the aluminum foil pan as well as attaching an aluminum cover.

Canadian Patent #1,317,774, "Oven Pan Holder and Combination of Oven Pan Holder with Oven Pan", Sarnoff et al, 18 May 1993, discloses a wire frame to support an aluminum foil oven pan and a method to connect the frame to the aluminum foil pan.

Handi-foil Corporation, of Wheeling Ill., manufactures a wire based rack for use inside an aluminum foil pan that attaches to the rim of the aluminum foil pan and can be locked onto the rim of the pan for lifting and carrying.

SUMMARY

The aluminum foil pan carrier system, which is the subject of this disclosure, provides structural strength that the aluminum foil pan does not have, thereby preventing collapse of the aluminum foil pan during movement and lifting. This improvement in strength and prevention of collapse is based on two factors: first, the bottom of the aluminum foil pan rests on top of the carrier, and second, the vertical side arms of the carrier prevent lateral movement of the aluminum foil pan and also help support the sides of the aluminum foil pan. Two of the side arms are also provided with horizontal flanges that provide convenient lifting points for the user to lift and carry both the carrier and the aluminum foil pan.

The collapse of an aluminum foil pan when filled with hot contents can lead to serious burns to the user as well as loss of the contents of the aluminum foil pan.

While the description and drawings all relate to lifting and carrying aluminum foil pans, it is also possible to use the aluminum foil pan carrier system with other types of pans made from ceramic, metal, glass, and plastic, which while rigid, may be more reliably lifted and carried using the aluminum foil pan carrier system. References are made to using the aluminum foil pan carrier system to load and unload ovens, while this is deemed to be its primary use, it can also be used to load and unload pans of any type into and out of refrigerators, microwaves, industrial food processors, etc.

These together with additional objects, features, and advantages of the aluminum foil pan carrier system will be readily apparent to those of ordinary skill in the art upon reading the following detailed description of presently preferred, but none the less illustrative, embodiments of the aluminum foil pan carrier system, when taken in conjunction with the accompanying drawings. In this respect, before explaining the current embodiments of the aluminum foil pan carrier system in detail, it is to be understood that the present technology is not limited in its application to the details of construction and arrangements of the components set forth in the following description or illustration. The present technology is capable of other examples and of being practiced and carried out in various ways. It is also to be understood that the phraseology and terminology employed herein are for purposes of description and should not be regarded as limiting.

Those skilled in the art will appreciate that the concept of this disclosure may be readily used as a basis for the design of other structures, methods, and kits for carrying out the several purposes of the aluminum foil pan carrier system. It is therefore important that the claims be regarded as including such equivalent constructions in so far as they do not depart from the spirit and scope of the present technology.

According to an embodiment of the disclosure, an aluminum foil pan carrier system includes a first rigid support arm and a second rigid support arm. The first rigid support arm and the second rigid support arm are configured to support an aluminum foil pan.

According to another embodiment of the disclosure, an aluminum foil pan carrier system is disclosed. The carrier system includes a first rigid support arm including a pair of opposing end portions extending substantially perpendicular to a planar surface thereof. A second rigid support arm includes a pair of opposing end portions extending substantially perpendicular to a planar surface thereof, wherein the first rigid support arm and the second rigid support arm are configured to support an aluminum foil pan.

According to yet another embodiment of the instant disclosure, an aluminum foil pan carrier system is disclosed. The carrier system includes a first rigid support arm including a pair of opposing end portions extending substantially perpendicular to a planar surface thereof and a second rigid support arm including a pair of opposing end portions extending substantially perpendicular to a planar surface thereof. The first rigid support arm and the second rigid support arm are configured to support an aluminum foil pan. A planar central portion is formed between the first rigid support arm and the second rigid support arm. The planar portion can have various shapes, including rectangular, square, circular, ovoid, etc. and can have one or more apertures therein.

Objects of the aluminum foil pan carrier system, along with various novel features that characterize the present technology are particularly pointed out in the claims forming a part of this disclosure. For better understanding of the aluminum foil pan carrier system, its operating advantages, and specific objects attained by its users refer to the accompanying drawings and description.

DRAWINGS

DETAILED DESCRIPTION

Figure 1:
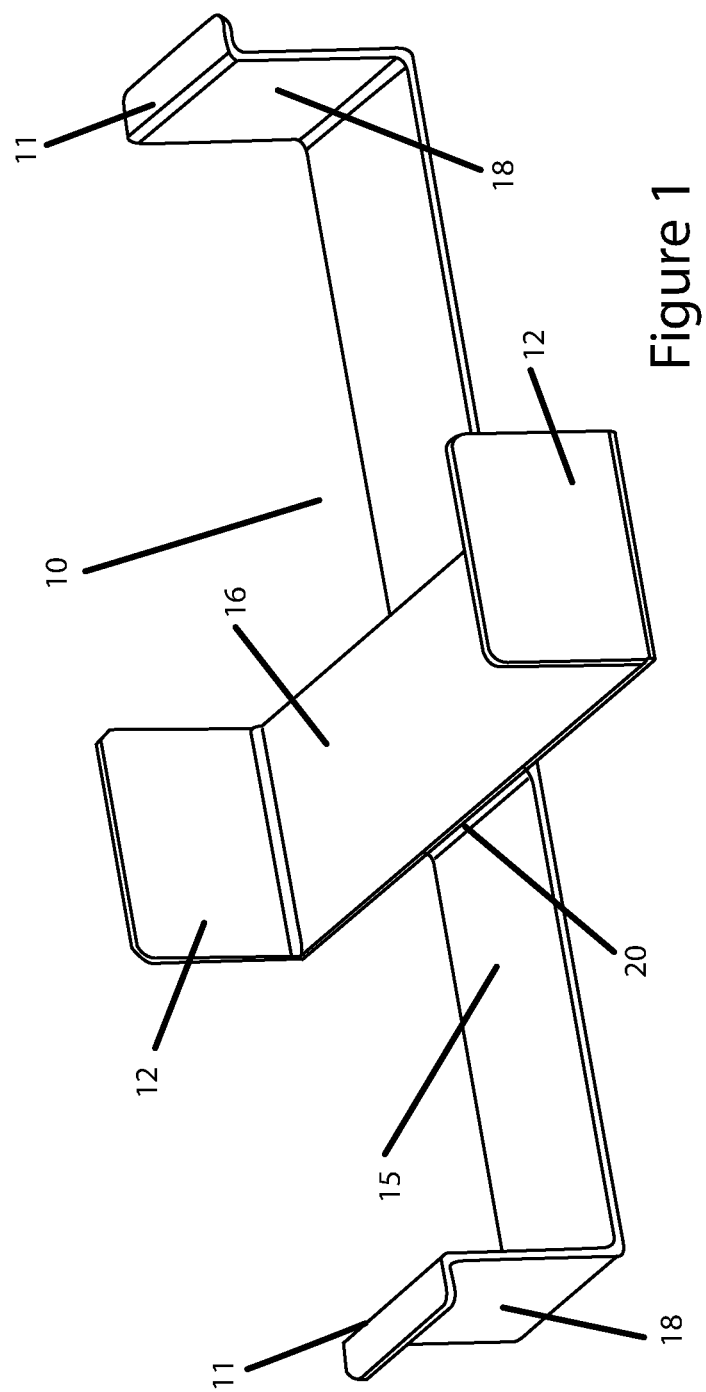
FIG. 1 is a top perspective view of a first embodiment of the aluminum foil pan carrier system.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "front," "back," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the drawings, specific examples of the principles and concepts of the aluminum foil pan carrier system are presented in detail.

As shown in FIG. 1, a first embodiment of the aluminum foil carrier system, 10, consists of two major components: a first arm 15 (rigid support arm) and a second arm 16 (rigid support arm) having a length less than a length of the first arm. The arms 15, 16 are connected by two filet seam welds 20 that hold the two arms 15, 16 in contact and at approximately right angles (about 90° to 125°) to one another. The second arm 16 has two end portions 12 which are folded up at approximately right angles (about 90° to 125°) with respect to a planar surface of the second arm 16 to provide a barrier to the lateral movement of the aluminum foil pan. The first arm 15 also has two end portions 18 which are folded up at approximately right angles (about 90° to 125°) with respect to a planar surface of the first arm 15 to provide a barrier to prevent longitudinal movement of the aluminum foil pan. Distal ends of the two end portions 18 of the first arm 15 are further bent at approximately right angles (about 90° to 125°) with respect to a planar surface of the end portions 18 to provide lifting and carrying handles 11. The attachment between the first arm 15 and the second arm 16 is shown as filet welds 20 but they could also be attached via rivets, spot welds, screws, glue, etc.

The length of the first arm 15 and the second arm 16 arms is selected to fit the sizes of various aluminum foil pans, for example, 12×12 inch square aluminum pans, 12×18 inch rectangular aluminum pans, 18 inch oval aluminum pans. However, the lengths of the arms 15, 16 can be any dimension to accommodate any size aluminum pans, as desired. In the particular case of square pans, the two arms 15, 16 would be equal in length.

The heights of the vertical end portions 12, 18 can be made to a height slightly shorter than the height of a flange portion of the aluminum foil pan. However, the heights of the end portions 12, 18 can be manufactured to be just below the height of the deepest flange portion of the deepest aluminum foil pan and then used with shallower aluminum foil pans by slightly deforming the flanges of the shallower pans in the areas of the end portions 12, 18.

In the first embodiment of aluminum foil pan carrier system 10, the arms 15, 16 can be manufactured from metal such as aluminum or steel or from plastic such as high temperature silicone, for example. Although, other materials can be contemplated, if desired. When plastic is used, the arms 15, 16 can be extruded or injection molded depending on the type of plastic and the desired appearance. If plastic is used, it can be heat resistant and able to maintain its strength at various oven temperatures. Examples of plastics include: nylon, high performance polyester, polyamide, polyetherimide, polyimide, polyamide-imide, polyphenylene sulfide, polyphenylen oxide and polystyrene, polyether ether ketone, and fluoropolymers including polytetrafluoroethylene. Various metals can be used in forming the aluminum foil pan carrier system 10, including steel, stainless steel, aluminum, etc. Composites can be used, including enamel coated metal, ceramic coated metal, plastic coated metal, etc.

Figure 2:
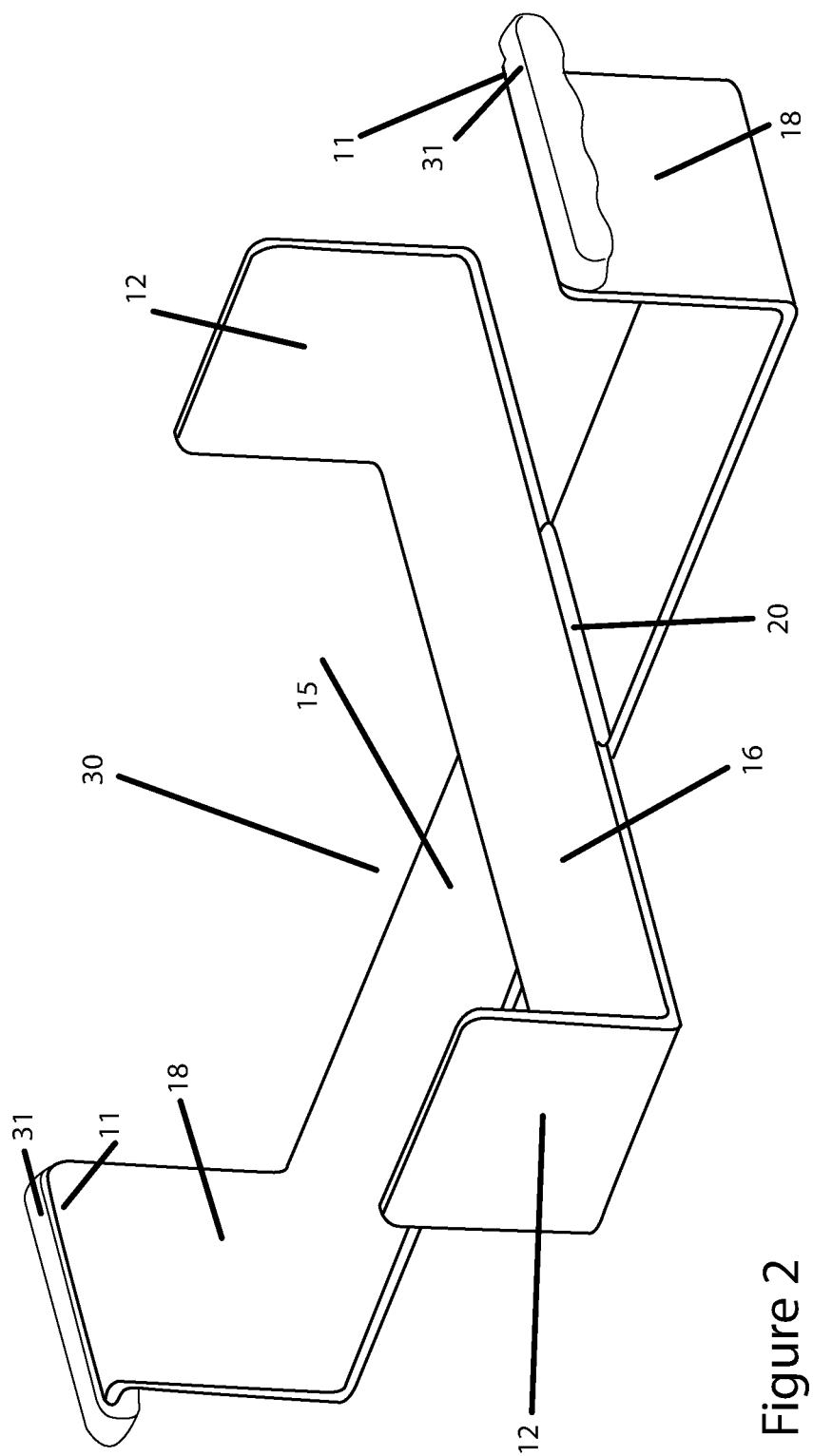
FIG. 2 is a top perspective view of the aluminum foil pan carrier system of FIG. 1 with thermally low conductivity hand grips attached.

As shown in FIG. 2, a second embodiment of an aluminum foil pan carrier system 30 is illustrated. The carrier system of FIG. 2 is similar to the carrier system 10 of FIG. 1, except the carrier system 30 can be equipped with optional low thermal conductivity hand grips 31. The hand grips 31 can be formed of silicone, rubber, plastic, or other heat resistant materials. The hand grips 31 can be advantageous when the aluminum foil pan carrier system 30 is made of metal, for example. The hand grips 31 are attached to the lifting and carrying handles 11 in a secure fashion using glue, screws, press-fitting, over-molding, or some other acceptable attachment means.

Figure 3:
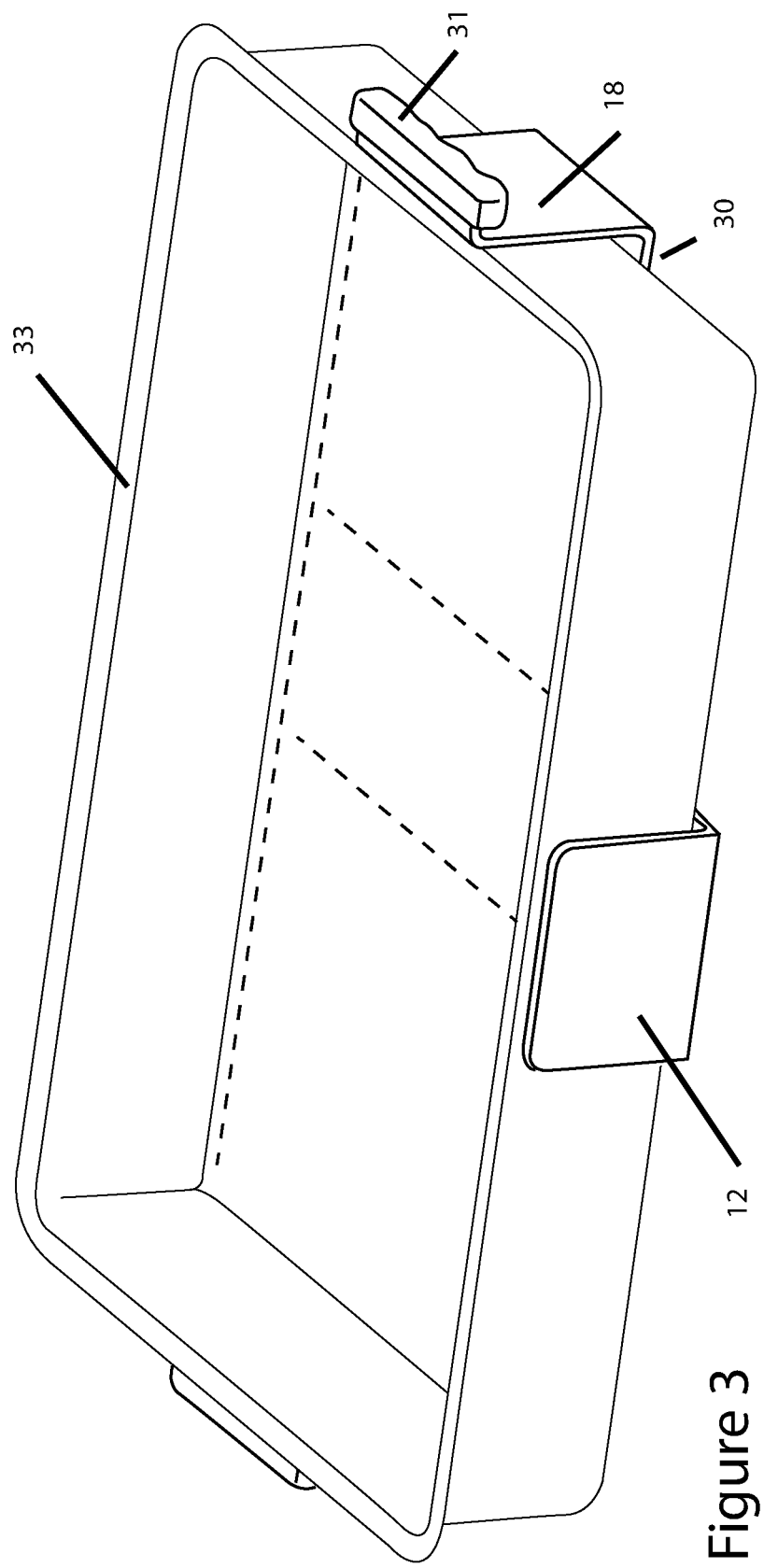
FIG. 3 is a top perspective view of the aluminum foil pan carrier system of FIG. 2 with thermally low conductivity hand grips attached holding a rectangular aluminum foil pan.

FIG. 3 shows the aluminum foil pan carrier system 30 equipped with hand grips 31 carrying a rectangular aluminum foil pan 33. Due to the fact that the upper surface of the aluminum foil pan carrier system may not be flat (the second arm 16 sits on top of the first arm 15) the height of the aluminum foil pan 33 contents may deform the bottom of the aluminum foil pan 33 providing good contact with the aluminum foil pan carrier system 30. The end portions 12, 18 can provide for contact of the four sides of the aluminum foil pan 33 when the sides of the aluminum foil pan 33 bend or the aluminum foil pan 33 shifts preventing any significant side to side movement of the aluminum foil pan 33 during lifting and carrying by the handles 31.

Figure 4:
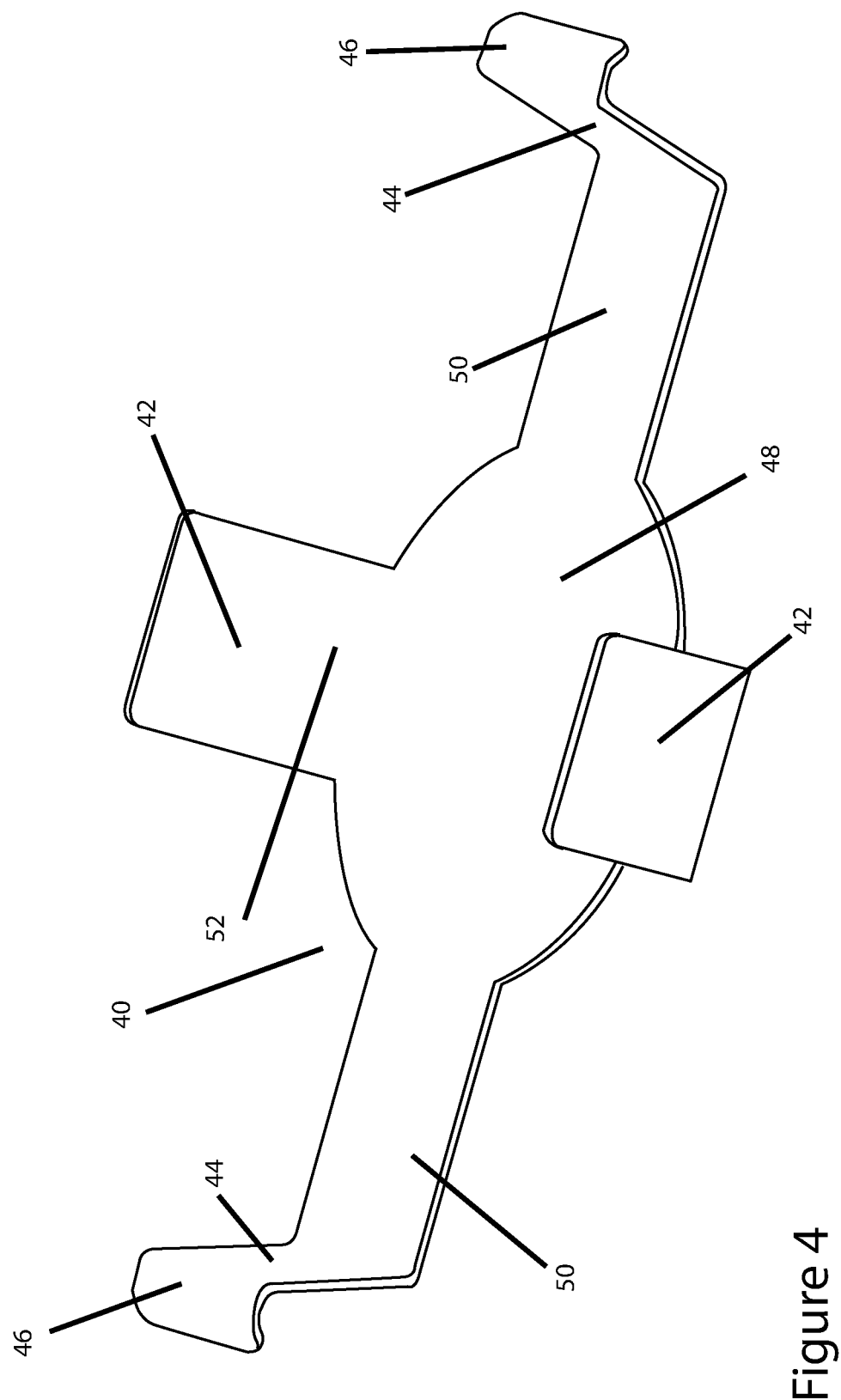
FIG. 4 is a top perspective view of an aluminum foil pan carrier system manufactured from a single sheet of material according to another embodiment of the disclosure.

FIG. 4 shows another embodiment of the aluminum pan carrier system 40. The carrier system 40 of FIG. 4 is similar to the carrier systems 10, 20 of FIGS. 1-3 except there is a flat central circular or oval portion 48, a pair of first arms 50, and a pair of second arms 52 having a length less than the length of the first arms 50. End portions 42 and 44 of the arms 50, 52 are folded up at an angle between about 90° and 125° to provide lateral and longitudinal support to the aluminum foil pan (not shown). A handle portion 46 of the first arm 50 is formed to provide a handle with a lip to prevent slipping.

The aluminum foil pan carrier system 40 can be formed from a single sheet of metal by a stamping process or can be heat formed or injection molded from a plastic material. The length of the arms 50, 52 can be sized to fit standard aluminum foil pans as described hereinabove with reference to the carrier system 10.

Figure 5:
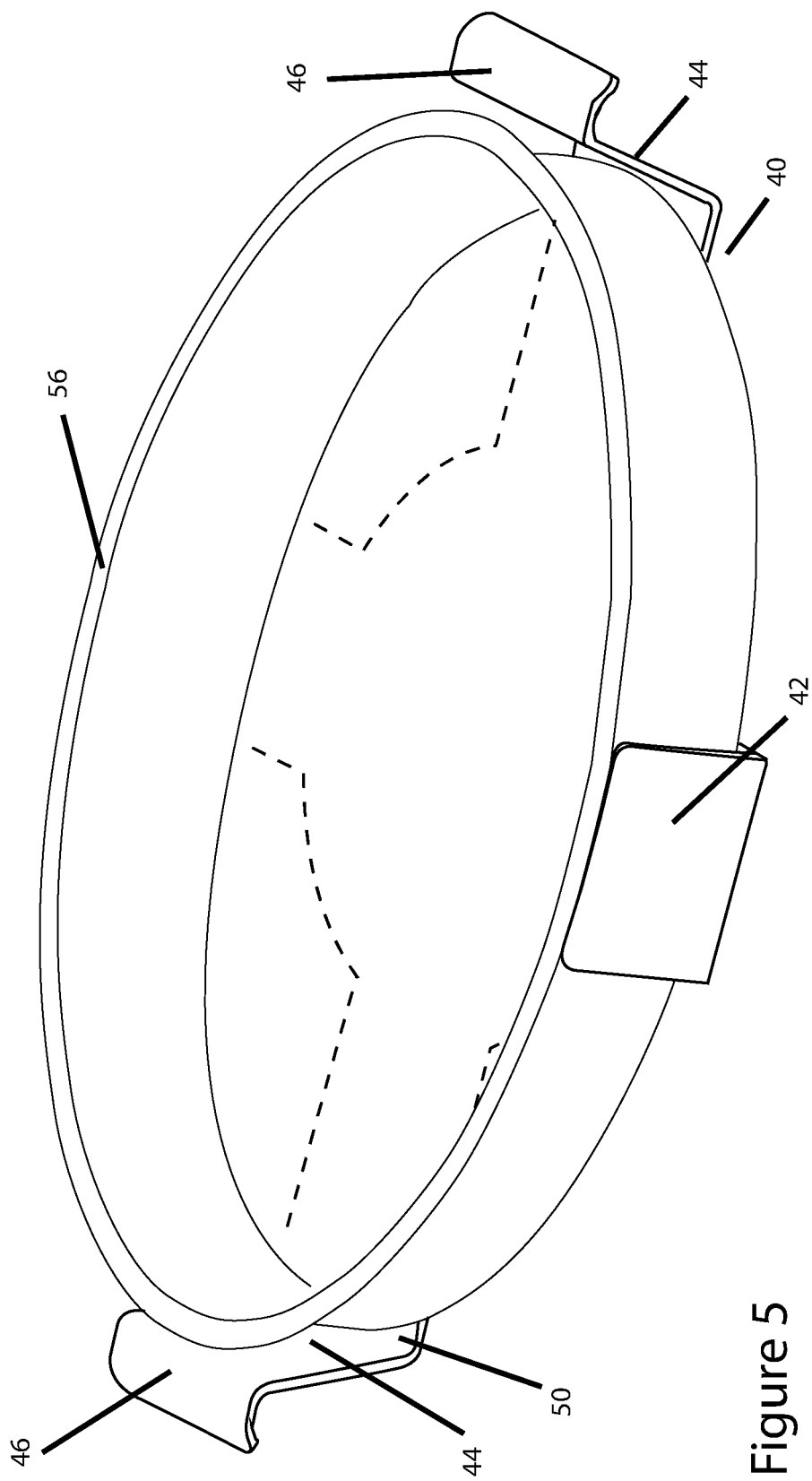
FIG. 5 is a top perspective view of an oval aluminum foil pan sitting on the aluminum foil pan carrier system of FIG. 4.

FIG. 5 illustrates the aluminum foil pan carrier system 40 supporting an oval aluminum foil pan 56 as used in various applications.

Figure 6:
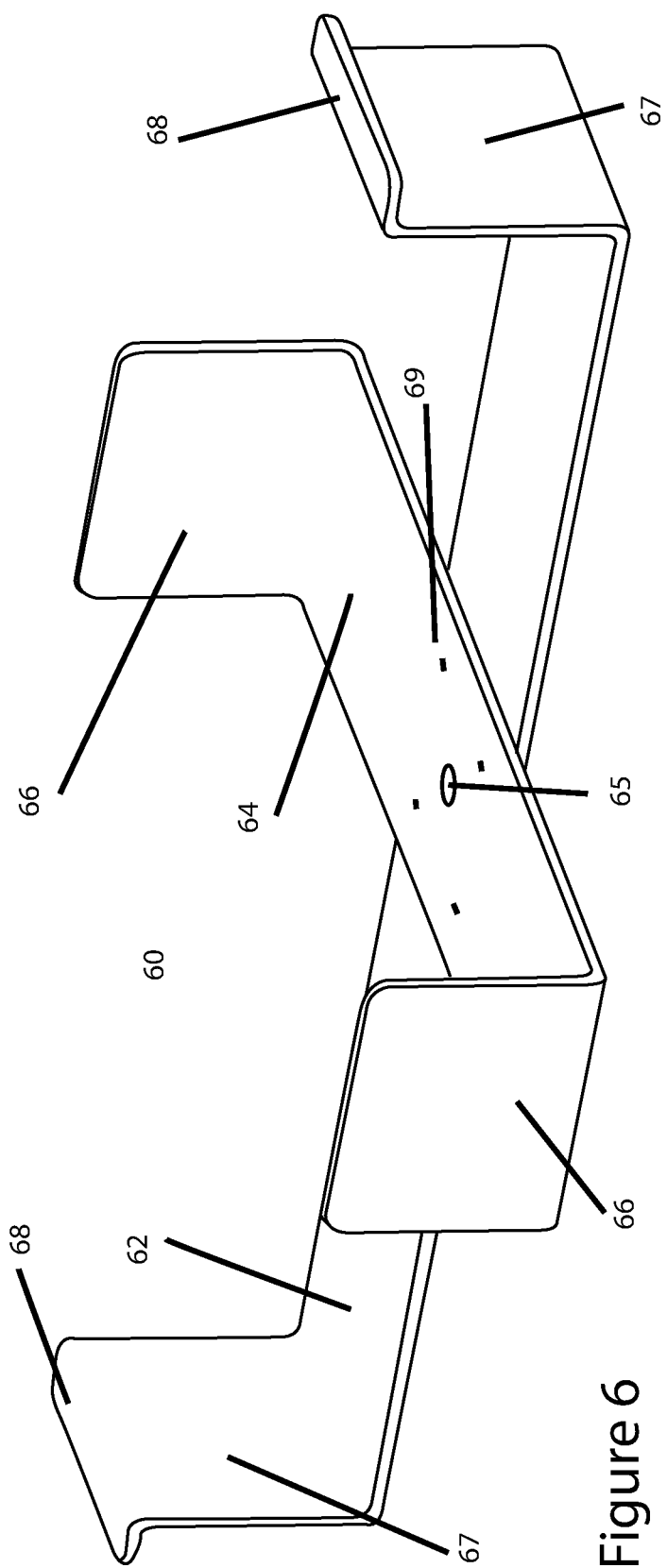
FIG. 6 is a top perspective view of an aluminum foil pan carrier system according to another embodiment of the disclosure, wherein two arms are rotatable and lockable relative to each other.

FIG. 6 shows an aluminum foil pan carrier system 60 according to another embodiment of the disclosure. The carrier system 60 is similar to the carrier systems 10, 30 illustrated in FIGS. 1-3, however, the difference between the embodiments is the carrier system 60 shown in FIG. 6, can be adjusted and locked for storage. The carrier system 60 includes a first arm 62 and a second arm 64 having a length less than a length of the first arm 62. The carrier system 60 can adjusted by pivoting the second arm 64 relative to the long arm 62 around pin 65, wherein the second arm 64 is received within and aligns lengthwise with the first arm 64. The pin 65 serves two purposes: first, the pin 65 provides for the possibility of rotation between the arms 62, 64 and second, and the pin 65 holds or couples the two arms 62, 64 in contact with one another. The installation of pin 65 through the centrally located holes in the arms 62, 64 usually involves deforming of one or both ends of the pin 65 after insertion. Also shown in FIG. 6 are dimples 69 which are formed on both the arms 62, 64. The dimples 69 are formed in such a manner as to protrude outward in the same direction as end portions 66, 67 and inward on the opposite side of the arms 62, 64. The dimples 69 can be formed by using a punch that deforms the material of the arms 62, 64. There are four dimples 69 on each of the arms 62, 64 which are located equidistant from the pin 69. However, more than four or fewer than four of the dimples 69 can be included if desired at any distance from the pin 69. When the two arms 62, 64 are located as shown at about 90° with respect to each other, the upward protrusion of the dimples 69 in the first arm 62 can fit into the inward projection of the dimples 69 on the second arm 64 preventing relative rotation of the two arms 62, 64 relative to each other until an adequate torque is applied through the two arms 62, 64 around the pivot point defined by the pin 69.

Figure 7:
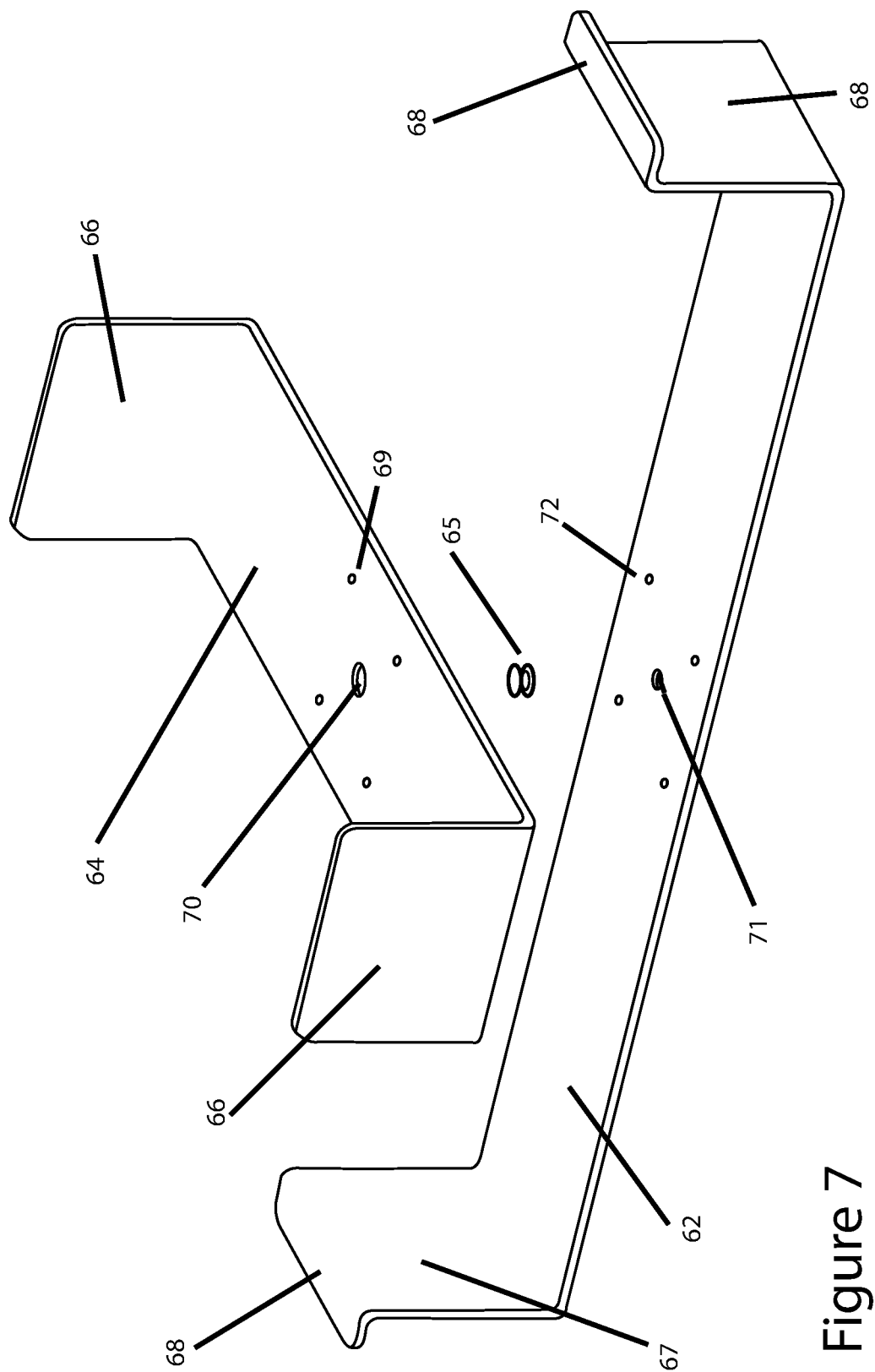
FIG. 7 is an exploded top perspective view of the aluminum foil pan carrier system of FIG. 6, wherein the two arms are rotatable and lockable relative to each other.

FIG. 7 shows an exploded view of the aluminum foil pan carrier system 60 of FIG. 6. In this view, a recessed hole 70 is located in the second arm 64 as well as a recessed hole 71 in the first arm 62. The pin 65 passes through the holes 70, 71. Recessing of the holes 70, 71 allow the heads of the pin 65 to be flush with the arms 62, 64, after installation.

Figure 8:
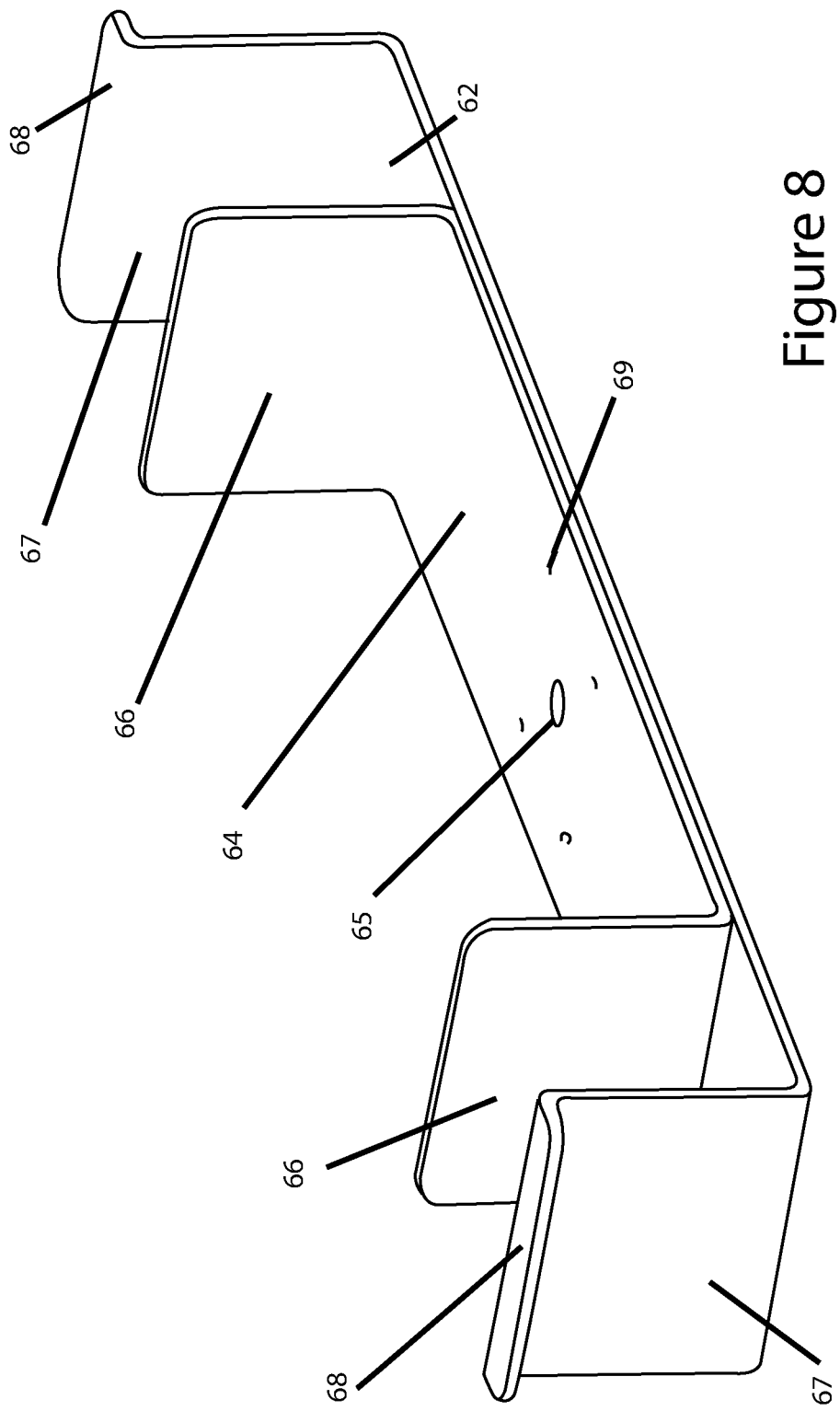
FIG. 8 is a top perspective view of the aluminum foil pan carrier system FIGS. 6-7, wherein the two arms are rotatable and lockable relative to each other and are shown in a folded position.

FIG. 8 shows the aluminum foil pan carrier system 60 of FIG. 6, wherein the arms 62, 64 have been rotated into the storage position. The dimples 69 in the second arm 64 and the first arm 62 can again be in alignment and provide a locking force in the storage position.

Figure 9:
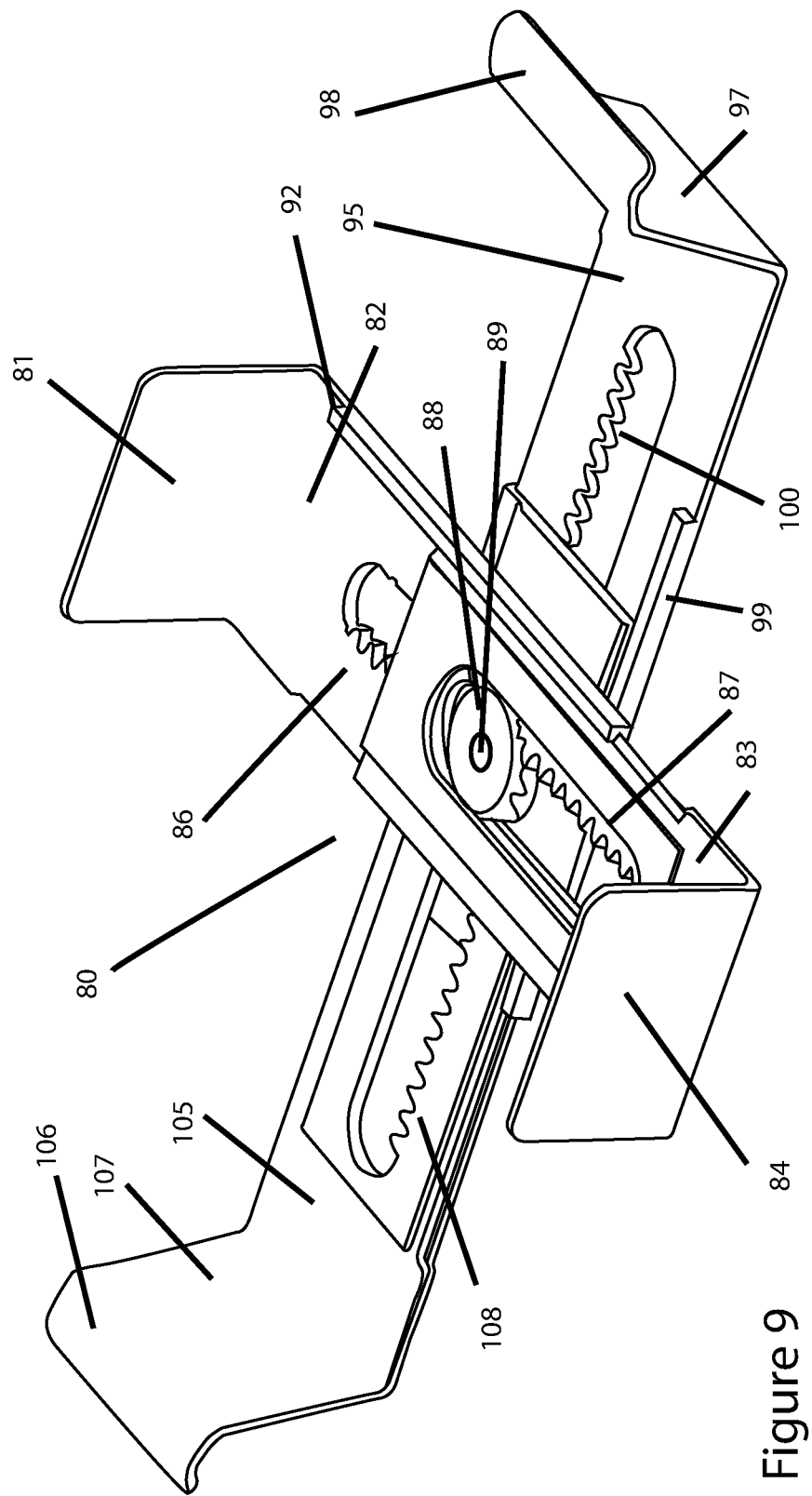
FIG. 9 is a top perspective view of an aluminum foil pan carrier system according to another embodiment of the disclosure, which has extendable arms that are also rotatable.
Figure 10:
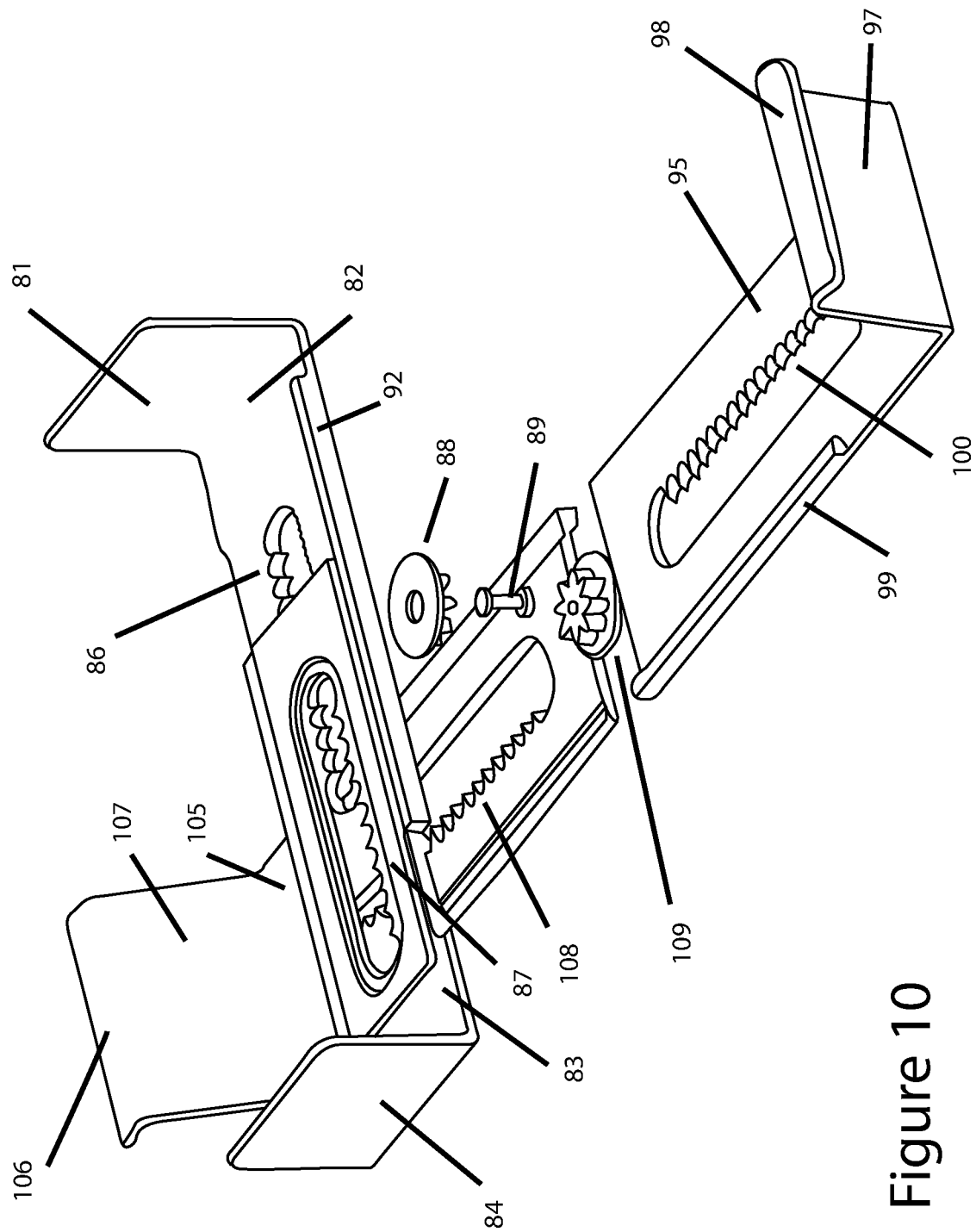
FIG. 10 is a top perspective exploded view of the aluminum foil pan carrier system of FIG. 9.

FIG. 9 shows an aluminum foil pan carrier system 80 according to another embodiment of the disclosure. The carrier system 80 is similar to the carrier systems 10, 30, and 60 of FIGS. 1-3 and FIGS. 6-8 except the carrier system 80 of FIG. 9 has the ability to adjust for various size aluminum foil pans and also folds for storage. There are two components that make up a first long arm, a first half 95 and a second half 105 which are connected through their respective rack teeth 100, 108 which both engage a gear 109 (not visible in FIG. 9 as it is below a gear 88 but is shown in FIG. 10). Additionally, a groove 99 in the first half 95 engages the edge of the second half 105 while at the same time a groove in the second half 105 engages the edge of the first half 95. The action of the gear 109 on the rack teeth 100, 108 ensures that the two halves 95,105 of the first arm move equally as the first arm is elongated or shortened. The length of the spacing between end portions 97, 107 while readily adjustable, maintains its length against applied forces through friction between the two halves 95, 105. If the friction between the two halves 95, 105 is deemed to be inadequate to prevent undesirable movement then some type of positive locking mechanism could be provided to lock the relative position of the two halves 95, 105.

There are two components that make up the second arm, a first half 82 and a second half 83, which are connected through their respective rack teeth 86, 87, which both engage a gear 88. Additionally, a groove 92 in the first half 82 engages an edge of the second half 83 while at the same time a groove in the second half 83 engages the edge of the first half 82. The action of the gear 88 on the rack teeth 86, 87 ensures that the two halves 82, 83 of the second arm move equally as the second arm is elongated or shortened. The length of the spacing between end portions 81, 84 while readily adjustable, maintains its length against applied forces through friction between the two halves 82, 83. If the friction between the two halves 82, 83 is deemed to be inadequate to prevent undesirable movement, then some type of positive locking mechanism can be provided to lock the relative position of the two halves 82, 83.

The two gears 88, 109 (not visible in FIG. 9 as it is below the gear, 88, but is shown in FIG. 10), are connected via a pin 89 such that they are both free to rotate about the pin 89. The halves 81, 83, as the second arm assembly, can be rotated about the pin 89 relative to the 1 halves 95, 105, as the first arm assembly. The friction between the two arm assemblies: the halves 95, 105, as the first arm assembly and the halves 82, 83 as the second arm assembly on the surfaces that are in contact between them can be used to hold them in angular position once that angular position has been set. If the friction between the two arm assemblies: the halves 95, 105 as the first arm assembly and the halves 82, 83 as the second arm assembly is deemed to be inadequate to prevent undesirable movement, then some type of positive angular locking mechanism could be provided, such as the dimples 69 as shown in FIG. 6.

The aluminum foil pan carrier system 80 is shown with the first arm and the second arm assemblies at about 90° to each other, ready to be used to carry an aluminum foil pan. It is assumed that a plastic material can be used for implementation of the carrier system 80, and that the components could be formed via injection molding. Examples of possible plastics include nylon, high performance polyester, polyamide, and polyetherimide. Although, other materials can be contemplated, if desired.

FIG. 10 shows an exploded view of the aluminum foil pan carrier system 80. The two gears 88, 109 are both visible in this view. As shown in this view, the two gears 88, 109 are shown with flanges that act on the outer surface of the first half 95 of the first arm and the second half 83 of the second arm. The flanges along with the pin 89 hold the two arm assemblies: the halves 95, 105 of the first arm assembly and the halves 82, 83 of the second arm assembly, in contact. It is possible to use two pieces, a washer and a gear without a flange, as an alternative to the flanged gears 88, 109.

Figure 11:
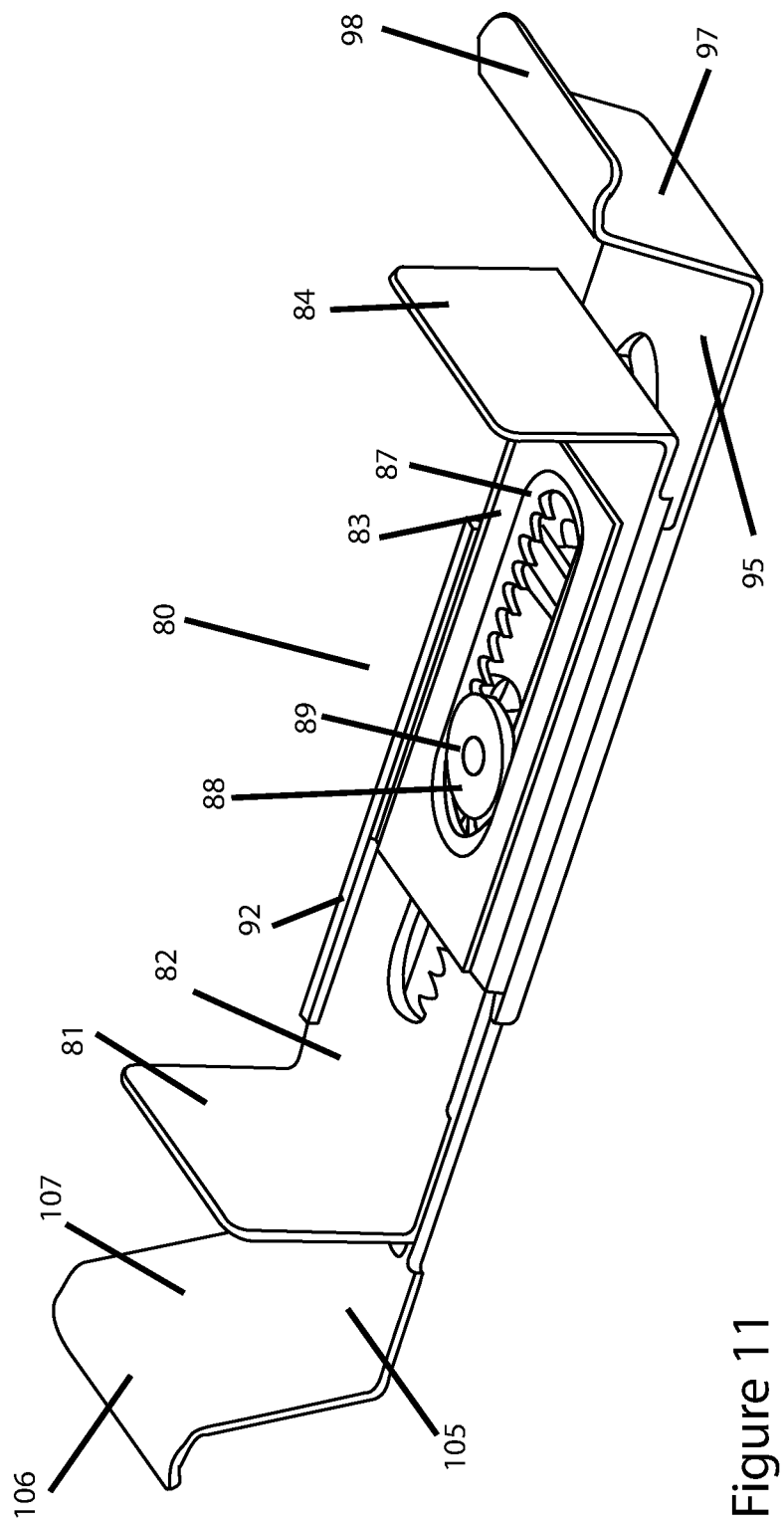
FIG. 11 is a top perspective view of the aluminum foil pan carrier system of FIGS. 9-10, wherein the aluminum foil pan carrier system is shown in a storage configuration.

FIG. 11 shows the aluminum foil pan carrier system 80 wherein the two arm assemblies, the halves 95, 105 as the first arm assembly and the halves 82, 83 as the second arm assembly, are folded for storage.

Figure 12:
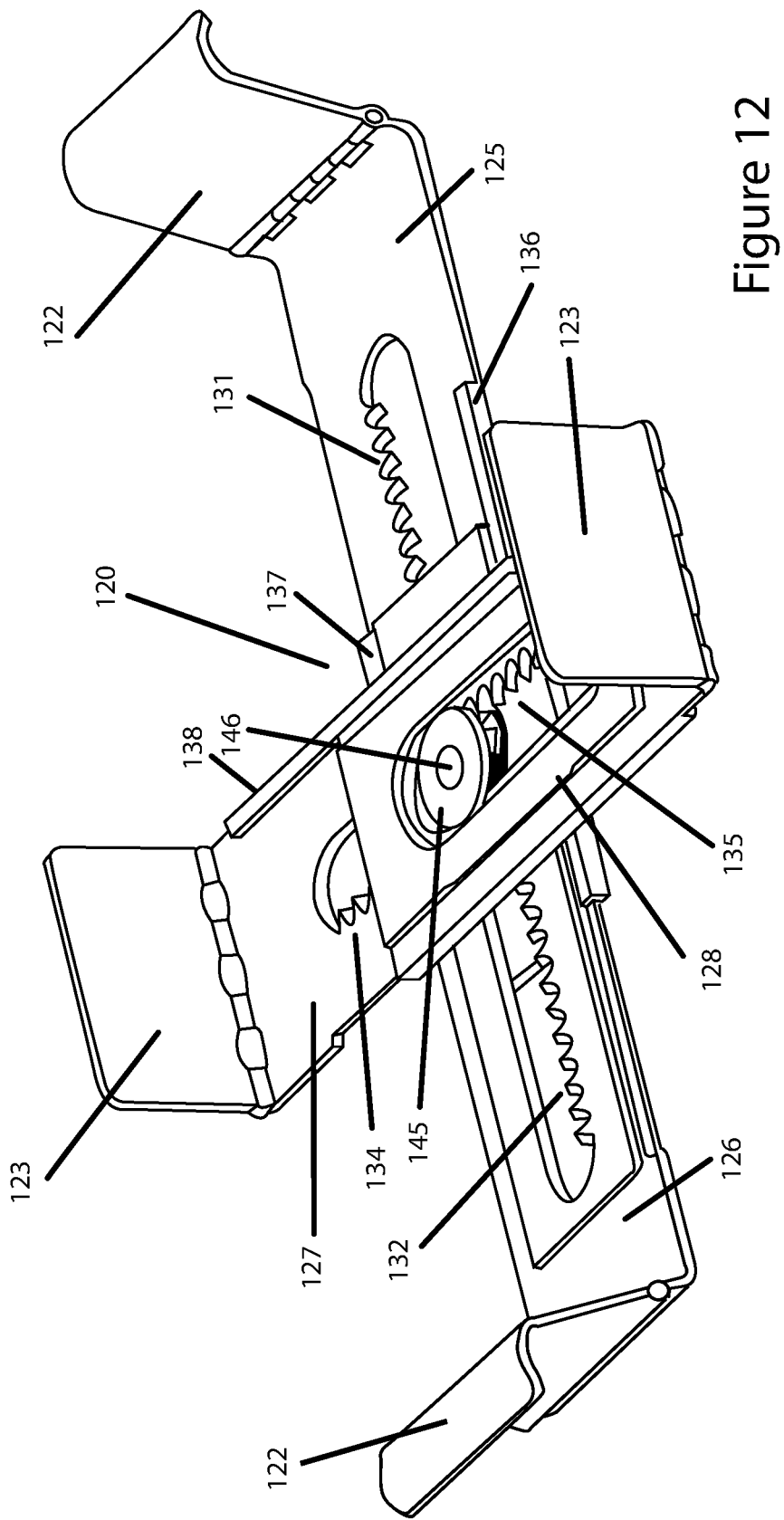
FIG. 12 is a top perspective view of an aluminum foil pan carrier system which has extendable arms with fold down ends that are also rotatable to different angular positions.
Figure 13:
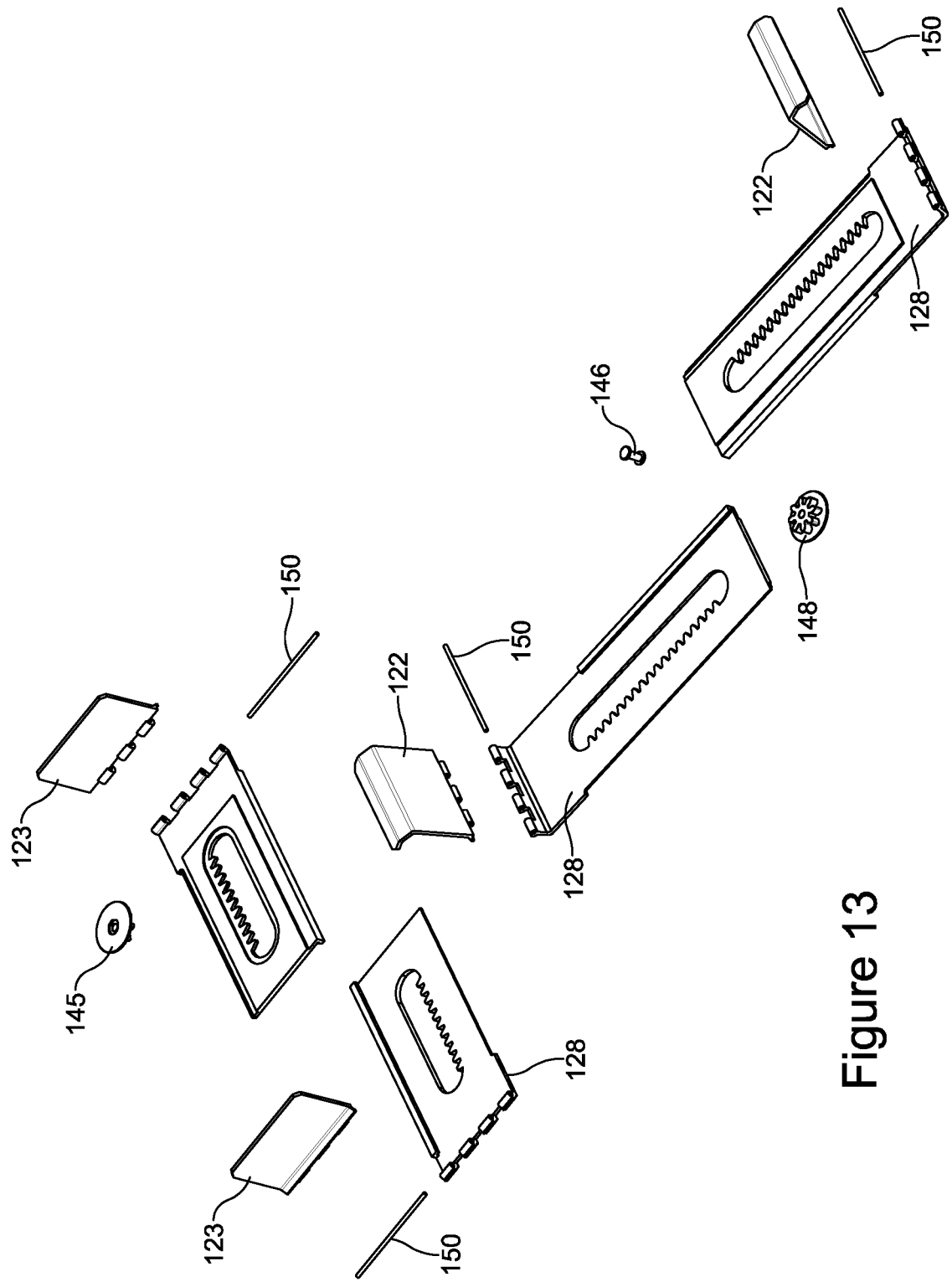
FIG. 13 is a top perspective exploded view of the aluminum foil pan carrier system of FIG. 12.

FIG. 12 shows an aluminum foil pan carrier system 120 according to another embodiment of the instant disclosure. The carrier system 120 is similar to the carrier system 80 of FIGS. 9-11 except the carrier system 120 has the ability to adjust for various size aluminum foil pans and also folds for storage. There are two components that make up the first arm, a first half 125 and second half 126 which are connected through their respective rack teeth 131, 132. The rack teeth 131, 132 both engage a gear 148 (not visible in FIG. 12 as it is below a gear 145, but is shown in FIG. 13). Additionally, a groove, 136, in the first half 125 engages the edge of the second half 126 while at the same time a groove in the second half 126 engages the edge of the first half 125. The action of the gear 148 on the rack teeth 131, 132, ensures that the two halves 125, 126 of the first arm move equally as the first arm is elongated or shortened. The length of the spacing between end portions 122, while readily adjustable, maintains its length against applied forces through friction between the two halves 125, 126. If the friction between the two halves 125, 126 is deemed to be inadequate to prevent undesirable movement, then some type of positive locking mechanism could be provided.

There are two components that make up the second arm, a first half 127 and a second half 128, which are connected through their respective rack teeth 134, 135. The rack teeth 134, 135 both engage a gear 145. Additionally, a groove 138 in the first half 127 engages the edge of the half 128, while at the same time a groove in the second half, 128 engages the edge of the first half 127. The action of the gear 145 on the rack teeth, 134, 135 ensures that the two halves 127, 128 of the second arm move equally as the second arm is elongated or shortened. The length of the spacing between end portions 123 while readily adjustable, maintains its length against applied forces through friction between the two halves 127, 126. If the friction between the two halves 127, 128 is deemed to be inadequate to prevent undesirable movement, then some type of positive locking mechanism could be provided.

The two gears 145, 148 (not visible in FIG. 12 as it is below a gear 145, but is shown in FIG. 13) are connected via a pin 146 such that they are both free to rotate about the pin 146. The halves 127, 126, as the second arm assembly, can be rotated about the pin 146 relative to the halves 125, 126, as the first arm assembly. The friction between the two arm assemblies, the halves 125, 126 as the first arm assembly and the halves 127, 128 as the second assembly on the surfaces that are in contact between them can be used to hold them in angular position once that angular position has been set. If the friction between the two arm assemblies, the halves 125, 126, as the first arm assembly and the halves 127, 128, as a second arm assembly is deemed to be inadequate to prevent undesirable movement, then some type of positive angular locking mechanism could be provided, such as the dimples 69 as shown in FIG. 6.

The end portions 122 of the halves 125, 126 are connected to the halves 125, 126 through a hinge arrangement so that they can be folded down for storage. End portions, 123 of the halves 127, 128 are connected to the halves 127, 128 through a hinge arrangement so that they can be folded down for storage.

The aluminum foil pan carrier system 120 is shown with the first arm and the second arm assemblies at about 90° to each other, ready to be used to carry an aluminum foil pan. It is assumed that plastic material can be used in various implementations of the aluminum foil pan carrier system 120, and that the components can be formed via injection molding. Examples of possible plastics include: nylon, high performance polyester, polyamide, and polyetherimide. Other heat resistant materials can be employed, if desired.

FIG. 13 shows an exploded view of the aluminum foil pan carrier system 120. Hinge pins 150 that are used to attach the portions 122,123 to their respective first arm assembly and second arm assemblies are shown in the exploded view. The hinge pins 150 are best manufactured from steel wire or rod for strength. It is assumed that the friction between the hinge pins 150 and the end portions 122, 123 can be adequate to hold the end portions 122, 123 in their position when the end portions 122, 123 have been rotated to their desired positions. If the friction between the end portions 122, 123, and the hinge pins 150 is deemed to be inadequate to prevent undesirable movement, then some type of positive locking mechanism could be provided.

Figure 14:
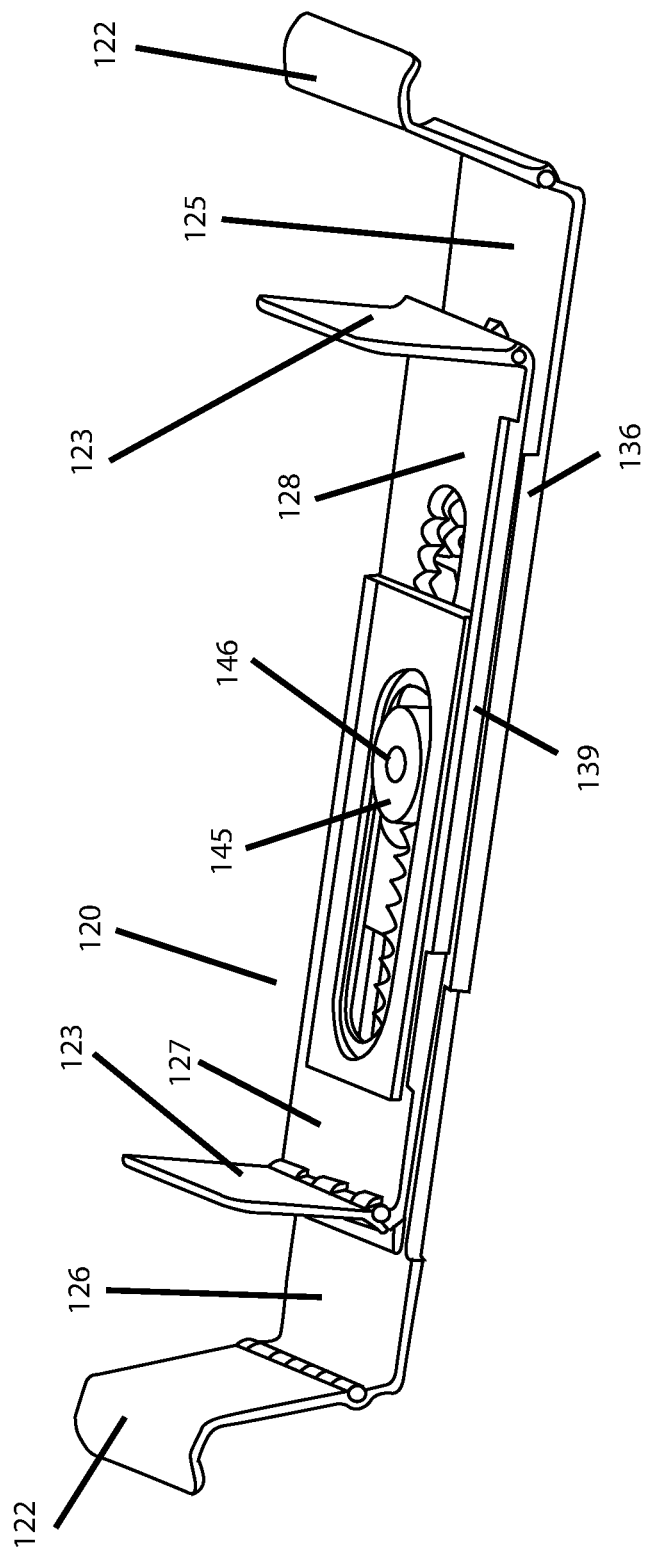
FIG. 14 is a top perspective view of the aluminum foil pan carrier system of FIGS. 12-13, wherein the aluminum foil pan carrier system is shown in a partial storage configuration.

FIG. 14 shows the aluminum foil pan carrier system 120 where the first arm assembly and the second arm assembly are folded for storage.

Figure 15:
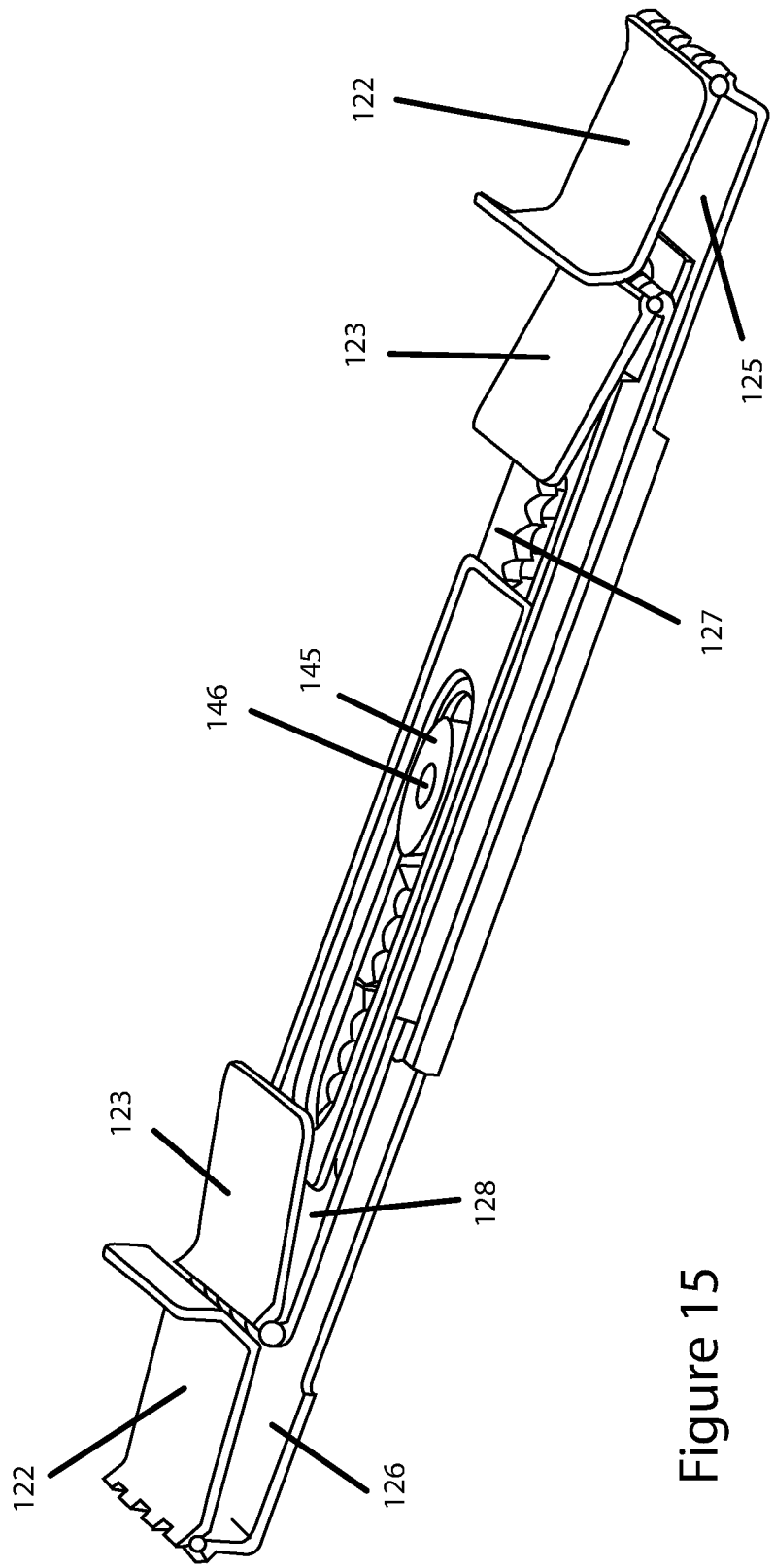
FIG. 15 is a top perspective view of the aluminum foil pan carrier system of FIGS. 12-14, wherein the aluminum foil pan carrier system is shown in the storage configuration.

FIG. 15 shows the aluminum foil pan carrier system 120 with the first arm assembly and the second arm assembly folded to be parallel to each other and the end portions 122, 12, are folded down for storage into a smaller, more compact size.

It is understood other configurations of an aluminum foil pan carrier system can be contemplated, if desired. For example, the carrier system 120 can be formed from any material or can have alternate configurations. For example, the first arm and the second arm is shown as rectangular, however other shapes can be contemplated such as polygonal or ovular for example. Additionally, the first arm and the second arm can be formed from wires or elongate pieces of material that can be adjusted as necessary to accommodate various sizes of aluminum pans.

Figure 16:
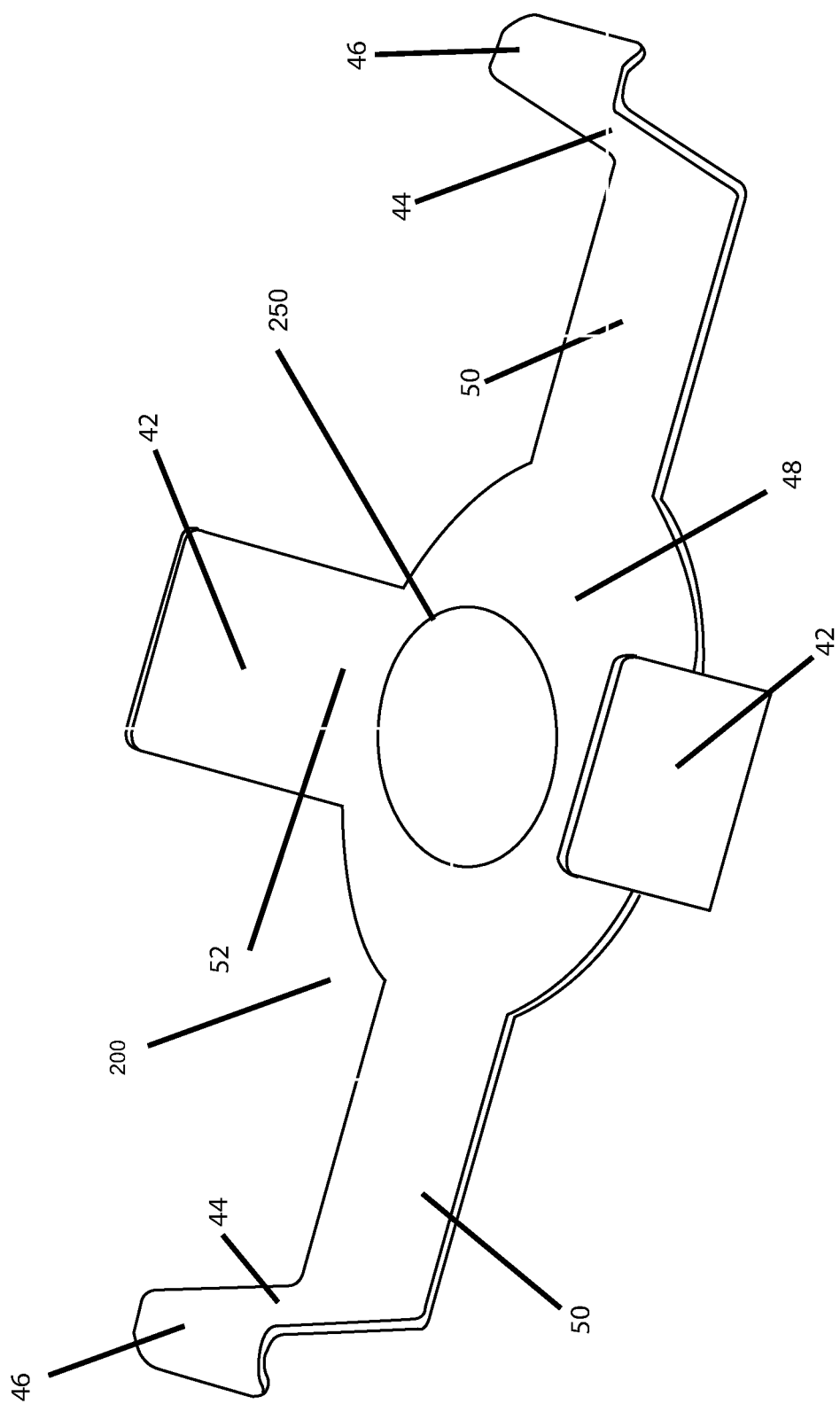
FIG. 16 is a top perspective view of an aluminum foil pan carrier system according to another embodiment of the disclosure.

In an embodiment of the disclosure, as shown in FIG. 16, the carrier system 200 can include an aperture 250 in which the carrier system 200 can be placed above a burner so the food contained in the aluminum pan can be continuously warmed or heated. For example, the carrier system 200 can be inverted, a foil pan placed thereon, where the arms support the foil pan and allow a burner or heating element to be placed under the pan and heat the pan through the aperture 250.

With respect to the above description, it is to be realized that the optimal dimensional relationships for the aluminum foil pan carrier system, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the present technology.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. An aluminum foil pan carrier system comprising:
a first support arm having two opposed and facing end portions, each end portion extending upwards at an angle of about 90° to 125° with respect to a remainder of the first support arm, each end portion having a distal end extending at an angle of about 90° to 125° with respect to a remainder of the end portion, the distal ends extending in opposite directions with respect to each other to provide lifting and carrying handles;
a second support arm, wherein the first support arm and the second support arm are configured to support an aluminum foil pan; and
a planar central portion formed between the first support arm and the second support arm, wherein a width of the first support arm and a width of the second support arm are each less than a width of the planar central portion, and the planar central portion, the first support arm, and the second support arm together provide a flat surface.

2. The aluminum foil pan carrier system of claim 1, wherein the first support arm has a length greater than a length of the second support arm.

3. The aluminum foil pan carrier system of claim 1, wherein the first support arm is disposed at an angle from the second support arm, wherein the angle is between about 90 degrees and about 125 degrees.

4. The aluminum foil pan carrier system of claim 1, wherein each of the distal ends includes a low thermal conductivity hand grip.

5. The aluminum foil pan carrier system of claim 1, wherein each of the end portions is hingedly coupled with respect to the remainder of the first support arm.

6. The aluminum foil pan carrier system of claim 1, wherein the first support arm is coupled to the second support arm by a weld.

7. The aluminum foil pan carrier system of claim 1, wherein an aperture is formed in the planar central portion.

8. The aluminum foil pan carrier system of claim 1, wherein the first support arm is adjustable with respect to a length thereof and the second support arm is adjustable with respect to a length thereof.

9. The aluminum foil pan carrier system of claim 8 wherein the first support arm is formed from a first half and a second half and the second support arm is formed from a first half and a second half, and wherein the first half of the first support arm and the second half of the first support arm are adjustable with respect to each other by a rack teeth and gear and the first half of the second support arm and the second half of the second support arm are adjustable with respect to each other by a rack teeth and gear.

10. The aluminum foil pan carrier system of claim 1, wherein the second support arm has two opposed and facing end portions, each end portion extending upwards at an angle of about 90° to 125° with respect to a planar surface of the second support arm.

11. An aluminum foil pan carrier system comprising:
a first support arm including a pair of opposing and facing end portions extending substantially perpendicular to a planar surface thereof, each end portion having a distal end extending substantially perpendicular with respect to a remainder of the end portion, the distal ends extending in opposite directions with respect to each other to provide lifting and carrying handles; and
a second support arm including a pair of opposing end portions extending substantially perpendicular to a planar surface thereof, wherein the first support arm and the second support arm are configured to support an aluminum foil pan, wherein the first support arm pivots with respect to the second support arm.

12. The aluminum foil pan carrier system of claim 11, the second support arm is configured to be selectively received in and aligned with the first support arm.

13. The aluminum foil pan carrier system of claim 11, wherein the first support arm is coupled to the second support arm by a pin.

14. The aluminum foil pan carrier system of claim 11, wherein the first support arm is operable to be selectively positioned with respect to the second support arm between an angle of 0 degrees and about 125 degrees.

15. An aluminum foil pan carrier system comprising:
a first support arm including a pair of opposing and facing end portions extending substantially perpendicular to a planar surface thereof, each end portion having a distal end extending substantially perpendicular with respect to a remainder of the end portion, the distal ends extending in opposite directions with respect to each other to provide lifting and carrying handles;
a second support arm including a pair of opposing end portions extending substantially perpendicular to a planar surface thereof, wherein the first support arm and the second support arm are configured to support an aluminum foil pan; and
a planar central portion formed between the first support arm and the second support arm, wherein a width of the first support arm and a width of the second support arm are each less than a width of the planar central portion, and the planar central portion, the first support arm, and the second support arm together provide a flat surface.

16. The aluminum foil pan carrier system of claim 15, wherein an aperture is formed in the planar central portion.

17. The aluminum foil pan carrier system of claim 15, wherein each distal end is substantially parallel to the planar surface of the first support arm.

18. An aluminum foil pan carrier system comprising:
a first support arm including a pair of opposing and facing end portions extending substantially perpendicular to a planar surface thereof, each end portion having a distal end extending substantially perpendicular with respect to a remainder of the end portion, the distal ends extending in opposite directions with respect to each other to provide lifting and carrying handles;
a second support arm including a pair of opposing and facing end portions extending substantially perpendicular to a planar surface thereof, wherein the first support arm and the second support arm are configured to support an aluminum foil pan; and
a planar central portion is formed between the first support arm and the second support arm, a width of the first support arm and a width of the second support arm are each less than a width of the planar central portion, and the planar central portion, the first support arm, and the second support arm together provide a flat surface, wherein an aperture is formed in the planar central portion and the aluminum foil pan carrier system is formed of metal.

\* \* \* \* \*